Nov. 16, 1943.  O. C. MOLL  2,334,687
CONNECTOR
Filed Aug. 9, 1941
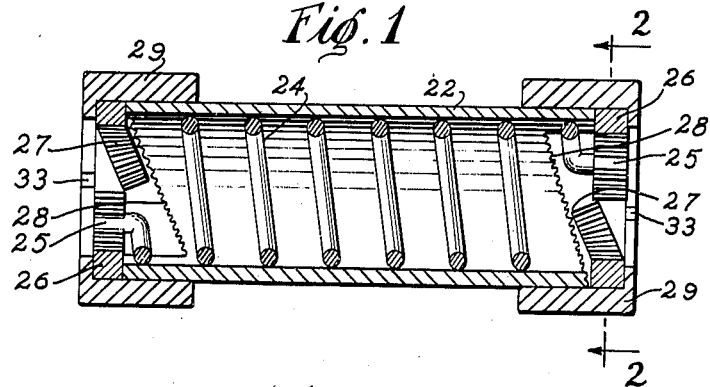
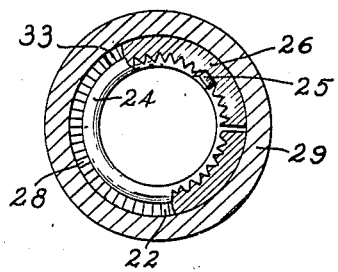
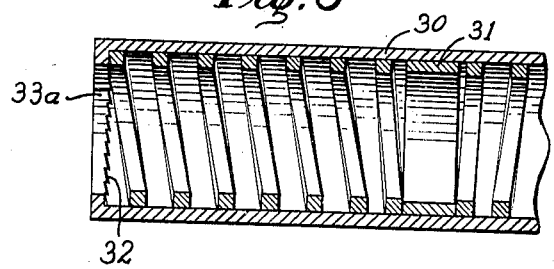
INVENTOR
OSWIN C. MOLL
ATTORNEY Patented Nov. 16, 1943

2,334,687

UNITED STATES PATENT OFFICE 2,334,687

CONNECTOR

Oswin C. Moll, Manhasset, N. Y.

Application August 9, 1941, Serial No. 406,076

11 Claims. (Cl. 285—193)

The present invention relates to couplings, and more particularly to an improved means for coupling the ends of two conduits, for example, electrical conduits.

A common type of electrical conduit is an iron pipe. The pipe is made in standard lengths and joined together to reach from one point to another. In many instances, pieces shorter than the regular lengths are required and the standard length of pipe has to be cut and threaded on the job for connection with another pipe. The threading operation requires considerable time particularly where it has to be done at locations where automatic machinery is not available. This, of course, increases the cost of the installation, likewise considerable time is required to thread the end of the pipe into the connecting sleeve. In addition, the thickness of the pipe has to be sufficiently great to permit it to be threaded at any point. This requires a thicker and more expensive pipe than would be necessary if the threading operation could be eliminated. Various attempts have been made to eliminate the threading operations, but they have not been commercially successful. Conduits in use today follow generally the old practice of threading standard lengths of pipe and connecting them with a threaded sleeve, in spite of the conceded objections thereto.

The present invention aims to overcome the above difficulties by providing an improved coupling means, effective upon the smooth ends of pipes, whereby the threading operation may be eliminated and a thinner pipe may be utilized. In addition, the invention reduces substantially the time required in securing the ends of two pipes in a connecting sleeve.

An object of the present invention is to provide a simple and effective connecting sleeve for connecting the ends of pipes used for electrical conduits.

Another object of the invention is to provide improved means readily applicable to existing pipes and capable of holding them securely in position.

Another object of the invention is to provide an improved means for securing the ends of pipes which may be readily attached to various connectors.

Another object of the invention is to provide an improved connecting device utilizing a ratchet means to prevent release of the connecting means.

Other and further objects of the invention will be obvious upon an understanding of the illustrative embodiment about to the described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a longitudinal sectional view of a preferred embodiment of the invention;

Fig. 2 is a transverse sectional view along the line 2—2 of Fig. 1; and

Fig. 3 is a longitudinal sectional view of another embodiment of the invention.

Referring again to the drawing and more particularly to Figs. 1 and 2 thereof illustrating a preferred embodiment of the invention, there is shown a member 22 having a cylindrical bore sufficiently large to fit about the ends of pipes to be joined together. A coil spring 24 is mounted within the member 22 and preferably fits snugly on the interior thereof. The ends 25 of the spring are fitted into recesses in the sleeves 26 mounted at the respective ends of the member 22. The sleeves 26 are provided with ratchet teeth 27 thereon which engage corresponding ratchet teeth on the ends of the member 22 to facilitate the operation of the device. Collars 29 are secured to each of the ends of the member 22 to hold the sleeves 26 in position. A notch 33 may be provided in each of the collars 29 to permit a tool to be inserted for engagement with the bevelled ends of the collar 29 to release the ratchet if removal of the pipes from the coupling should be desired. In the operation of the device, which is used to retain the ends of two pipes in operative relation with respect to each other, the ends of the pipes are inserted in the respective ends of the unit. The relative size of the pipe and the unit are such that the sleeves 26 of the unit grip about the ends of the pipes to permit relative longitudinal movement and prevent rotary movement. As the pipes are rotated after being inserted in the unit, the sleeves 26 rotate with the pipe and carry with them the ends 25 of the spring 24. By rotating the two pipes in opposite directions, the sleeves are rotated to constrict the spring about the pipe. The grip is sufficiently tight to embed the spring to a slight extent in the outer surface of the pipe, which is ordinarily made of relatively soft metal thereby securely holding it in position.

The construction illustrated in Fig. 3 is somewhat similar to that illustrated in Figs. 1 and 2. A helical member 31 substantially in the form of a flat coil spring is mounted in the bore of the cylindrical member 30. The two helical portions of the spring 31 are preferably integral at their center. The ends of the helical portion engage the ratchet teeth 32 on the ends of the member 30. The member 30 may be made of a metal which can be flanged inwardly after the spring 31 is inserted therein. A notch 33a may be provided in the flange to permit a tool to be inserted for releasing the ratchet if removal of the pipe from the coupling should be desirable.

When the ends of two pipes to be joined are inserted in the ends of a unit, the helical member frictionally engages the surface of the pipe and permits longitudinal movement thereof but prevents relative rotary movement. By rotating the pipes in opposite directions, the helical members contract thereabout and form a very tight grip. The ratchet member 32 at the ends of the pipe 30 prevent the loosening of the grip on the pipe when the rotative force is released. Thus the ends of the two pipes may be securely connected without the formation of threads thereon and with a minimum of time and effort. In those cases where it is necessary to uncouple the ends of the pipe, the notch 33a may be utilized for the insertion of a tool to disengage the end of the spring from the ratchet 32.

It will be seen that the present invention provides a construction for securing the ends of pipes, such as are used for electrical conduits, securely in position with a minimum of time and effort. The threading operation heretofore utilized at the ends of pipe is eliminated. Secure clamping action is obtained by rotating the ends of the pipe in opposite directions to constrict helical members about the ends. The helical members ordinarily lock themselves in position preventing disengagement thereof.

The device is simple in construction and easy to manufacture at a low cost. The units are rugged in construction and fully capable of withstanding the rough usage to which they may be subjected.

As various changes may be made in the form, construction and arrangement of the parts herein without departing from the spirit and scope of the invention, and without sacrificing any of its advantages, it is to be understood that all matter herein is to be interpreted as illustrative and not in a limiting sense.

Having thus described my invention, I claim:

1. In a device of the class described, the combination of a member having a substantially cylindrical bore therein, helical means mounted in said bore, and a ratchet connection between the end of said helical means and said first member, whereby said helical means may be constricted about the end of a conduit to hold it in said bore.

2. In a device of the class described, the combination of a member having a bore therein, helical means mounted in said bore and ratchet means permitting movement of one end of said helical means in one direction and for preventing movement in the opposite direction and means for restricting the movement of the other end of said helical means, whereby said helical means may be constricted about the end of a conduit to hold it in position in said bore.

3. In a device of the class described, the combination of a member having a bore therein, helical means in said bore, means for preventing movement of one end of said helical means in one direction circumferentially of the bore and for permitting movement in the opposite direction and means for preventing movement of the other end of said helical means in the direction of the permitted movement in said first end whereby the helical means may be constricted about the end of a pipe to hold it in position in said bore.

4. In a device of the class described, the combination of a member having a bore therein, helical means in said bore, means for permitting movement of one end of said helical means in one direction circumferentially of the bore and for preventing movement in the opposite direction and means for preventing movement of the other end of said helical means in the direction of the permitted movement of said first end and for permitting movement in the opposite direction whereby the helical means may be constricted about the ends of two aligned pipes to hold them in position in said bore.

5. In a device of the class described, the combination of a member having a bore therein, helical means in said bore to hold a member therein, ratchet means at one end of said first member having a bore and a ratchet member operatively connected to one end of said helical means and adapted to cooperate with said ratchet means to permit movement of one end of the helical means in one direction and to prevent movement in the opposite direction.

6. In a device of the class described, the combination of a member having a bore therein, helical means in said bore adapted to extend about and hold a member therein, ratchet means adjacent the respective ends of said member having a bore and a ratchet member at each end of said member having a bore adapted to cooperate with the ratchet means, said ratchet members being operatively connected to the ends of said helical members to move in opposite circumferential directions and to prevent reverse movement thereof.

7. In a device of the class described, the combination of a pipe, helical means within the pipe for holding a member therein, a collar adapted to extend about the end of the pipe, ratchet means formed in the end of the pipe by cutting away a portion thereof and a ratchet member mounted between the end of said pipe and said collar adapted to cooperate with said ratchet means, the end of said helical means being operatively connected to said ratchet member.

8. In a device of the class described, the combination of a cylindrical member, helical means in said cylindrical member for engaging and holding a member therein, collars secured to the ends of said cylindrical member, ratchet means at the respective ends of the cylindrical member and ratchet members at the respective ends of the cylindrical member in operative relation to said ratchet means, the ends of said helical member being operatively connected to said ratchet members to permit the respective ends of the helical member to move in one direction and to prevent movement in the opposite direction.

9. In a device of the class described, the combination of a member having a bore therein, helical means in said bore for engaging and holding a member therein, a collar mounted about the end of said bore having a flange adapted to overhang the end thereof, said first member having ratchet means associated therewith and a ratchet member held in position by the flange on said collar operatively connected to the helical means and adapted to engage said ratchet means to permit rotation of said helical means in one direction and to prevent rotation in the opposite direction.

10. In a device of the class described, the combination of a member having a bore therein, helical means in said bore adapted to engage and hold a conduit, a collar mounted on the end of said member having an inturned flange and a ratchet member operatively connected to said helical member and held in position by said flange, said flange being cut away at a portion thereof to permit the insertion of an instrument for releasing said ratchet member.

11. In a device of the class described, the combination of a member having a bore therein and helical means in said bore adapted to engage and hold a conduit, the end of said member having an inturned part with ratchet means thereon, the end of said helical member being held in position by said inturned member and being prevented from rotation in one direction by said ratchet member.

OSWIN C. MOLL.